Sept. 28, 1965    J. C. PRICE    3,208,121
STORAGE REEL
Filed Oct. 3, 1963
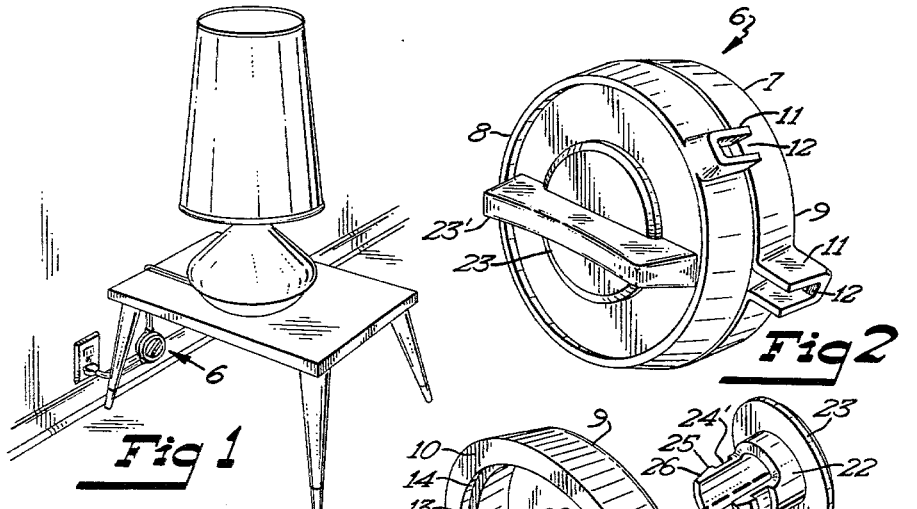
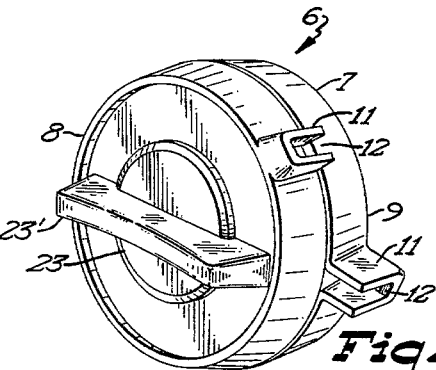
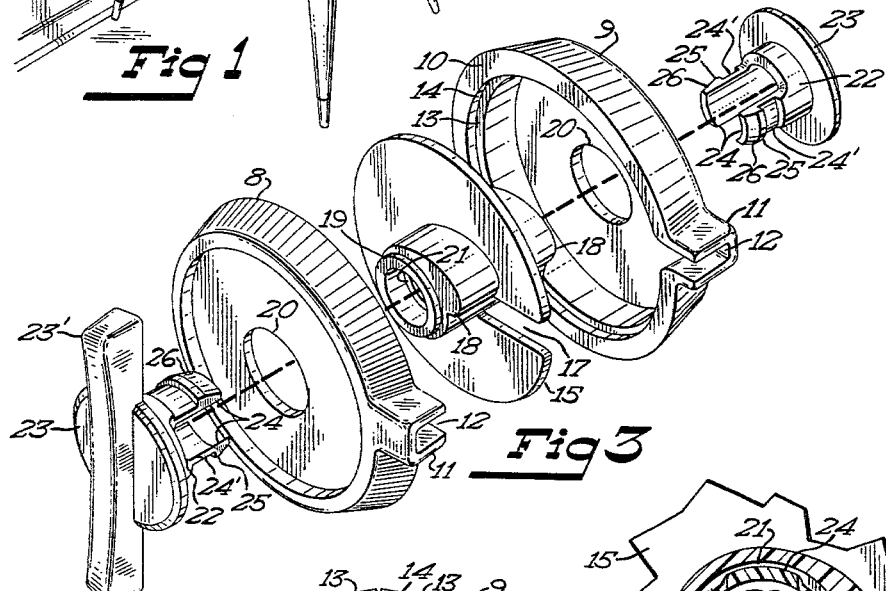
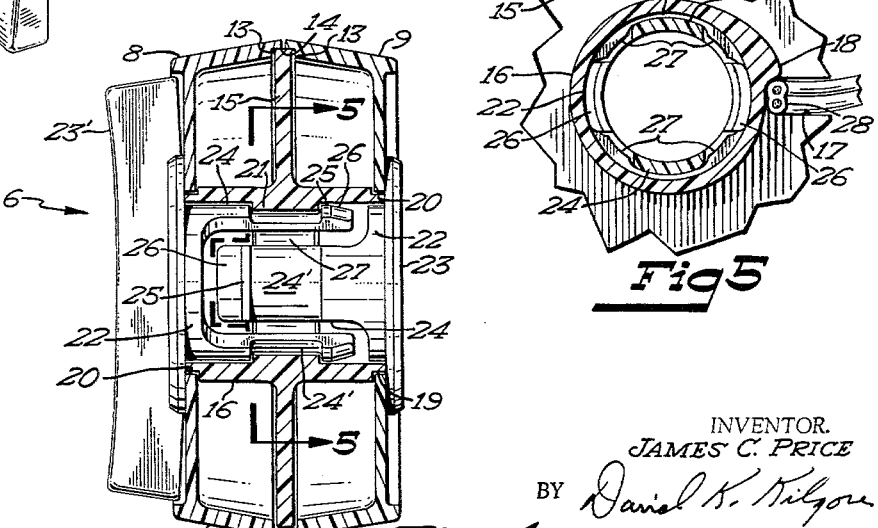
INVENTOR.
JAMES C. PRICE
BY Daniel K. Kilgore
ATTORNEY

3,208,121
STORAGE REEL
James C. Price, 2941 Noble Ave., Minneapolis, Minn.
Filed Oct. 3, 1963, Ser. No. 313,603
4 Claims. (Cl. 24—71.2)

This invention relates broadly to reels; more particularly to storage reels for electric cords, rope lines, leaders, hose and the like; and specifically to a storage reel of the class described wherein the materials stored thereon, may be withdrawn selectively from either end of said material.

Thus, the principal object of the invention is to provide a storage reel for electric cords, rope lines, leaders, hose, and like materials wherein said materials wound on said reel may be withdrawn selectively and/or simultaneously from either end portion thereof, and selectively rewound from either of said ends thereby storing any slack material on the said reel.

A further object of the invention is to provide a storage reel for electric cords, rope lines, leaders, hose, and the like that is relatively simple and inexpensive to manufacture in multiple sizes preferably of non-conductive materials.

A further object of this invention is to provide a storage reel for electric cords, hose, and the like wherein such materials may be completely wound on said reel and the same placed in storage as an entirety or to provide storage for only rewound portions of said materials wherein the ends thereof remain connected to appliances, sprinklers, and the like and the other end portions thereof to such terminals as electric receptacles and fawcets.

These and other objects of the invention will become apparent from the following specifications and claims when taken in conjunction with the appended drawing which forms a part of this application and in which drawing, like characters indicate like parts throughout the several views.

To the above end, generally stated, the invention consists of the following devices and combination of devices hereinafter described and defined in the claims.

Referring to the drawing:

FIG. 1 is a perspective view illustrating the invention in use in connection with the electric cord of a table lamp.

FIG. 2 is a perspective view of the invention as an entirety without any material stored thereon.

FIG. 3 is a perspective view illustrating the several components of the invention in exploded relation.

FIG. 4 is an elevational view of the invention in assembled relation, some parts being sectioned, and FIG. 5 is a fragmentary sectional view taken along the irregular line 5—5 of FIG. 4.

While the instant invention has been thus far described as being a storage reel for elongate flexible elements such as electric cords, rope lines, leaders, hose and the like, for the purpose of brevity and clarity the term "cord" will be used hereinafter to cover all materials to be stored on said reel.

Referring more in detail to the drawing, the numeral 6 is directed to the invention as an entirety and comprises a relatively shallow cylindrical housing 7 affording a hollow chamber formed of two identical independent sections or shell halves 8 and 9 respectively having smooth meeting surfaces or edges 10 affording a close working fit between said sections. Formed in the peripheral wall of each of the respective housing sections 8 and 9 is an upstanding boss 11 also having identical meeting surfaces, each of said bosses 11 being provided with a longitudinally disposed slot 12 that affords access to the interior of the housing 7 when the sections 8 and 9 thereof are in assembled relation.

A circumferentially disposed shoulder 13 is formed on the inside of each housing section 8 and 9 adjacent the outer edge portion thereof and when the respective housing sections are in assembled relation, the shoulders 13 forms a groove 14 which guides a disk-like member or insert 15 mounted on and formed integral with a tubular hub 16 having common rotation with the said disk 15 which travels in the groove 14. The disk or insert 15 is provided with a relatively deep longitudinally disposed notch 17 that extends substantially to the tubular hub 16 and extends to the outer periphery of the housing to facilitate orientation of the disk or insert 15 out of obstructing relation with the slots 12 to thereby permit a looped cord to be received in the housing and to permit the insert 15 to be moved into the loop of the cord. The insert 15 with the notch 17 affords a pick-up and positioning means for a cord, not shown, wound on the tubular hub 16. It is further important that the disk-like member 15 also acts as a divider for the housing 7 wherein predetermined lengths of the cord wound on the said hub 16 are disposed in separate chambers of the housing 7.

A longitudinally disposed cam-like boss or radial enlargement 18 is formed on the tubular hub 16 and extends substantially the full length thereof but is positioned out of the path of the notch 17 which extends through the body of the disk 15 substantially to the hub 16 proper. It will be understood that the hub 16 is of the same width as the interior of the housing 7 and is held positioned therein against endwise movement and for axial rotation by means of narrow flanges 18 that are dimensioned to engage opposing central bores or apertures 20 in the housing sections 8 and 9 respectively. An internally disposed annular groove 21 is formed adjacent each end portion of the tubular hub 16 the purpose of which will presently appear.

A pair of substantially identical hub clips 22 having face plates 23 and a finger piece 23' formed integral with at least one of said face plates are provided with inwardly projecting radially disposed split shanks 24, constructed and arranged for endwise engagement the one with the other. The other end portion of the split shanks 24 is provided with an annular boss 25 having tapered end portions 26.

The hub clips 22 afford means whereby the entire unit is held in assembled relation as will hereinafter be described.

The housing sections 8 and 9 with the disk-like member 15 positioned in the groove 14 and flanges 19 on the outer end portions of the tubular hub 16 in engagement with the central bores 20, in the housing sections 8 and 9, are manually held so positioned. The hub clips 22 are then inserted endwise from both sides of the unit through the central bores 20 and the tubular hub 16 mounted therein, and firmly pressed in such position until the annular bosses 25 snap into engagement with the annular groove 21 in the hub 16. It will be understood that the split shanks 24 of the hub clips 22 are so positioned that the radially parallel shanks 24 of one clip member are at 90 degrees to the radially parallel shanks 24 of the other whereby the respective opposed shank members may pass therebetween into engagement with the said annular groove 21 in the hub 16.

It is important to note at this point that a plurality of relatively shallow bosses or detents 27 are radially disposed about the annular groove 21. Said bosses 27 provide engagement with the shanks 24 of the hub clips 22 whereby common rotation is imparted to the hub 16 and its mounted disk-like member 15, and the said hub clips 22, by the manipulation of the finger piece 23' mounted on one of the face plates 23.

In making use of the invention it will be understood that the slots 12 formed in the bosses 11 in the respective housing sections must first be in opposed transverse alignment to afford an open aligned passageway to the interior of the housing 7 for the cord, not shown, that has been looped or doubled upon itself at any given point thereon. The loop of this cord is then inserted into the passageway formed by the aligned slots 12. By means of the finger piece 23' on the face plate 23 the entire assembly with the exception of the housing sections 8 and 9, which are held manually against rotation, the said finger piece 23' is rotated counter-clockwise and the cord loop is picked up by the notch 17 in the disk 15 to thus wind the respective ends of the cord on the hub 16 on both sides of the disk 15 to the full length of the free end portion of the cord or to such an extent as may be required by a specific use or installation. It is important to note at this point that in view of the fact that both of the housing sections 8 and 9 are free to rotate independently about the longitudinal axis of the hub 16 and its cooperating components, the disk 15, and the hub clips 22, that by manually holding one housing section against rotation, the opposite housing section may be rotated and thus unwind a given length of cord from the hub associated with that housing section that is being rotated. Conversely, to rewind this same length of cord, it is only necessary to continue to hold the opposite housing section against rotation and thence rotate the opposing section in a clock-wise direction to take up the cord. With the slots 12 aligned, the cord may be entirely pulled out of the housing and separated therefrom; and when the slots 12 are disaligned, the cord cannot be inadvertently removed from the housing.

The purpose of the relatively large boss 18 formed integral with the hub 16 extending substantially to the root of the notch 17, is to facilitate the even, "laying on," of the end portions of the cord whereby a hump normally formed by the first convolution of the cord wound on the said hub is eliminated. Attention is directed to FIG. 5 wherein the cord is illustrated in cross-section and is identified by the numeral 28.

While there are herein disclosed but a limited number of embodiments of the structure, process, and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. A storage reel for storing cords,
comprising a pair of annular shell halves confronting each other to define a housing and having adjacent peripheral edges, each of said shell halves having a cord-receiving slot opening through said peripheral edge, said shell halves being rotatable relative to each other to permit said slots to be moved into alignment and open communication with each other and thereby permit a loop of the cord to be inserted through the aligned slots and into the housing with the opposite ends of the loop extending outwardly through respective slots, a rotatable cord winding hub in said housing and having means attachable to such a loop in the cord to facilitate winding of the cord into the housing, means engaging said shell halves and rotatably connecting said shell halves together to permit relative rotation of said shell halves and thereby move said slots out of alignment with each other with the ends of the loop of the cord in respective slots to prevent unintended removal of the cord from the housing and to permit said ends of the loop to be extended from the housing in a desired direction, and means effecting rotation of said hub.

2. A storage reel for storing cords,
comprising a pair of annular shell halves confronting each other to define a housing and having adjacent peripheral edges, each of said shell halves having a cord receiving slot opening through said peripheral edge, said shell halves being rotatable relative to each other to permit said slots to be moved into alignment and open communication with each other and thereby permit a loop of the cord to be inserted through the aligned slots and into the housing with the opposite ends of the loop extending outwardly through respective slots, a rotatable cord winding hub in said housing and having a rigid insert thereon extending outwardly to the inner periphery of the housing and out of obstructing relation with said slots in the shell halves to be rotated with the hub and sweep across said slots for insertion into the loop of the cord to carry the cord around the hub, means engaging said shell halves and rotatably connecting said shell halves together to permit relative rotation of said shell halves and thereby move said slots out of alignment with each other with the ends of the loop in the cord in respective slots to prevent unintended removal of the cord from the housing and to orient the ends of the loop in desired directions from the housing, and means effecting rotation of said hub.

3. A storage reel for storing cords,
comprising a pair of annular shell halves confronting each other to define a housing and having adjacent peripheral edges, each of said shell halves having a cord receiving slot opening through said peripheral edge, said shell halves being rotatable relative to each other to permit said slots to be moved into alignment and open communication with each other to thereby permit a loop of the cord to be inserted through the aligned slots and into the housing with the opposite ends of loop extending outwardly through respective slots, a rotatable cord winding hub rotatably mounted in said housing and having a rigid insert extending outwardly to the inner periphery of the housing, said insert being out of obstructing relation with said slots in the shell halves and said insert having a circumferentially facing cord-engaging portion to be rotated with the hub and sweep across said slots for insertion into the loop of the cord and to carry the cord around the hub, a radial enlargement on the hub periphery in circumferentially spaced relation with said cord engaging portion of the insert to guide the cord in formation of the convolutions on the hub.

4. A storage reel for cords,
comprising a pair of annular shell halve confronting each other to define a housing and having adjacent peripheral edges, each of said shell halves having a cord receiving slot opening through said peripheral edge, said shell halves being rotatable relative to each other to permit said slots to be moved into alignment and open communication with each other and thereby permit a loop of the cord to be inserted through the aligned slots and into the housing with the opposite ends of the loop extending outwardly through respective slots, said shell halves also having central apertures aligned with each other and substantially concentric of said peripheral edges, a rotatable cord winding hub concentric of said central apertures in said housing and having means attachable to such a loop in the cord to facilitate winding of the cord into the housing, a pair of end caps engageable with the shell halves to hold said shell halves together and permit relative rotation thereof, said end caps being insertable through said central apertures in the shell halves, interfitting clip means on said hub and said end caps and retaining said caps in predetermined relation with the hub and shell halves, and means for rotating said hub.

References Cited by the Examiner

UNITED STATES PATENTS

| | | | |
|---|---|---|---|
| 592,787 | 11/97 | Robeson et al. | 24—71.3 |
| 2,576,335 | 11/51 | Fanslow | 24—71.2 |
| 2,656,991 | 10/53 | Neely | 24—71.2 X |
| 2,952,420 | 9/60 | Von Hoorn | 24—71.2 |
| 2,991,523 | 7/61 | Del Conte | 24—71.2 |

DONLEY J. STOCKING, *Primary Examiner.*

BOBBY R. GAY, *Examiner.*